2,853,375

Patented Sept. 23, 1958

2,853,375

SMELTING OF TITANIFEROUS ORES

Peter J. Ensio, St. Lambert, Montreal, Canada, assignor to Quebec Iron and Titanium Corporation, Tracy, Quebec, Canada, a corporation of Canada No Drawing. Application March 21, 1956
Serial No. 572,834

4 Claims. (Cl. 75—31)

This invention relates to the electric furnace smelting of iron-bearing titaniferous ores with the resulting production of separately recoverable molten iron and molten titaniferous slag concentrate.

For decades in the past iron-bearing titaniferous ores have been smelted in electric furnaces under conditions which were determined on the basis that these ores were valuable primarily as a source of iron. Consequently, the ores were smelted with sufficient carbonaceous reducing material to effect reduction of substantially all of the iron oxide component of the ore. In order to obtain a readily recoverable iron product, it was the practice to add to the charge an extraneous fluxing material such as lime or magnesia in order to produce a titanium oxide-containing slag which was sufficiently fluid to permit liquation, and hence recovery by tapping, of the molten iron product.

From the standpoint of a source of readily recoverable titanium oxide, the slags produced by the aforementioned procedure left much to be desired because the slag contained not only such non-titaniferous diluents as the gangue components of the ore but also the extraneous fluxing material. A significant improvement in this direction was achieved by the smelting process described in the United States patent to Peirce et al. No. 2,476,453. As described in this patent, a fluid slag concentrate relatively high in contained titanium oxide is obtained by using not more, and generally less, carbonaceous reducing material than that theoretically required to reduce all of the iron oxide component of the ore to metallic iron, the titaniferous concentrate then containing at least 2% iron oxide (calculated as Fe). This result is obtained by correlation of the iron oxide and calcium oxide components of the titaniferous concentrate, the requisite amount of calcium oxide usually being present in sufficient quantity in the titaniferous ore, although it can be added from an extraneous source if necessary.

In all previous procedures for smelting iron-bearing titaniferous ores with the resulting production of separable molten iron product and molten titaniferous concentrate, including the representative procedures described hereinbefore, it has been generally recognized that in all operations wherein sufficient carbonaceous reducing material is present to approach complete elimination of iron oxide from the slag, the reducing agent has had a tendency to reduce the quadrivalent titanium (corresponding to titanium dioxide) to trivalent titanium (corresponding to titanium sesquioxide, $Ti_2O_3$). The formation of trivalent titanium in the concentrate has been widely recognized as the cause of an increasing viscosity in titaniferous concentrates with increasing smelting temperatures.

I have now discovered that the smelting conditions heretofore considered undesirable can be made to produce highly desirable results. That is, I have found that if an amount of carbonaceous material at least equal theoretically to that required to reduce all of the iron oxide component of the titaniferous ore to metallic iron, and if a sufficiently high smelting temperature is used, the resulting slag containing a relatively large amount of trivalent titanium is sufficiently fluid to be readily separable from the molten iron product of the smelting operation in the absence of any substantial amount of iron oxide or other fluxing material. I have found that this result can be achieved provided that the operation is carried out in such manner as to prevent destruction of the furnace by the high temperatures required; and this smelting condition can be achieved, I have found, by using hogged wood waste as the principal source of the solid carbonaceous reducing material. The use of this reducing material makes it possible to form such a relatively low density charge as to permit submerged arc conditions in the smelting zone. The resulting submerged arc smelting conditions make possible the use of very high smelting zone temperatures because of the shielding of the furnace interior by the low density charge enveloping the smelting arcs.

Accordingly, the method of my invention is directed to the smelting of iron oxide-bearing titaniferous ores in an electric furnace provided with the customary graphite electrodes. My method comprises preparing a smelting charge mixture composed substantially exclusively of the ore and solid carbonaceous material in which at least a major portion of the volume of the charge consists of hogged wood waste. The total fixed carbon content of this carbonaceous material should be such, in addition to the portion of the electrodes generally consumed during such a smelting operation, as to provide at least that amount of carbon required to reduce all of the iron component of the ore to metallic iron. This charge mixture is then delivered to the furnace in such manner as to maintain submersion of the electrode arcs beneath the charge. Heat is supplied to the charge by means of the arcs at a rate sufficient to effect smelting of the charge with the resulting formation of a metallic iron product and of a fluid supernatant titanium oxide-containing slag concentrate having a temperature of at least 1600° C. Under these smelting conditions, the titaniferous concentrate contains less than 2% (and generally less than 1%) by weight of iron oxide (calculated as Fe), and between about 40% and about 60% of the titanium oxide content of the slag concentrate is in the form of trivalent titanium.

Although the method of my invention is particularly applicable to the smelting of iron oxide-bearing titaniferous ores such as high grade ilmenite, it is also applicable to the smelting of low grade ilmenites as well as relatively low iron oxide-content titaniferous ores such as rutile. These ores may be used directly in preparation of the smelting charge pursuant to the invention or they may be beneficiated for the purpose of removing a substantial portion of their indigeneous gangue component so as to raise their total iron oxide-titanium oxide content to about 96% of the beneficiated ore. In any event, the ore is advantageously crushed so as to promote intimate contact with the carbonaceous reducing material in the charge mixture.

The solid carbonaceous material admixed with the titaniferous ore in practicing the invention must consist predominantly of hogged wood waste, sometimes known as "hogged fuel," such as that referred to by L. H. Banning in "The Role of the Electric Arc Furnace in Utilizing Some Strategic Off-Grade Ores," Journal of the Electrochemical Society, vol. 101, December 1954, similarly referred to by A. H. Roberson and L. H. Banning in "Preparation and Chlorination of Titaniferous Slags From Idaho Ilmenites," a paper presented before the A. I. M. E. in Chicago, Illinois, in February 1955. This material is a coarse wood waste such, for example, as log bark as well as mixtures of log bark with some wood chips and splinters resulting from the feeding of logs or wood slabs, edgings and other sawmill wastes through a machine called a "hog" wherein the material is mechanically disintegrated. The over-all density of the hogged wood waste is relatively low and it makes possible, upon subsequent admixture with a titaniferous ore, the formation of a low density charge. The bark component of this material may be obtained in the form of floating bark in the course of logging operations. As removed from the water, the bark contains at least 90% water, but after shaking the bark on screens its residual water content is lowered to around 80%. Thereafter, for the practice of my invention, this wet bark is passed through compression rolls of the type which are used for extracting juices from sugar cane, and as a result of this compression operation the water content of the bark is lowered to about 65% and is ostensibly dry. In this "dry" condition, the bark contains about 9% fixed carbon.

The fixed carbon content of the carbonaceous material used as the reducing material in the charge preparation pursuant to my invention should be sufficient to reduce all of the iron oxide component of the titaniferous ore to metallic iron. The determination of the amount of carbonaceous material required for this purpose should take account of the fact that the furnace electrodes will be partially consumed during smelting. When an amount of hogged wood waste necessary to furnish all of the requisite charge carbon (over and above that supplied by the consumed portion of the electrodes) has been admixed with the titaniferous ore, the charge will be characterized by such a low density that an electric arc furnace filled with the charge operates smoothly without smothering of the electrode arcs. However, when the density of the charge is increased by replacing a minor proportion by weight of the fixed carbon content of the hogged wood waste with conventional solid carbonaceous reducing material such as metallurgical coke, coal, or the like, the rate of downward movement of the charge in the furnace is hastened and there is a corresponding increase in the smelting rate. Regardless of whether the hogged wood waste constitutes all or less than all of the carbonaceous component of the charge, it should be of sufficient fineness to promote intimate contact between this component and the titaniferous ore admixed therewith.

The resulting physical admixture of the titaniferous ore and solid carbonaceous material consisting predominantly of hogged wood waste is then charged to the furnace in such manner as to maintain submersion of the electrode arcs. Although only a relatively shallow depth of charge above the lower portion of the electrodes is sufficient to maintain submersion of the electrode arcs, it is advantageous to maintain a more substantial depth of charge in order to provide a sufficient weight of the low density charge to promote downward movement of the charge into the smelting zone. Consequently, the deep layer of porous charge above the arc level provides a shield which protects the upper portion of the furnace, and particularly its arch, against overheating by the relatively high temperature prevailing in the arc-smelting zone.

The current supply to the shielded and submerged arcs is adjusted to supply not only enough heat to smelt the ore and produce a molten iron product but also to produce a molten titaniferous concentrate having a temperature, when tapped from the furnace, of at least 1600° C., and generally between 1600° and 1700° C. When the temperature in the smelting zone is maintained at this high level, the amount of carbonaceous material present in the charge, plus that available and consumed from the graphite electrodes themselves, is sufficient to lower the iron oxide content of the titaniferous concentrate to less than 2%, and usually to about 0.1%, by weight of the concentrate (calculated as Fe). These strongly reducing conditions, particularly at the prevailing high smelting temperature characteristic of my method, also cause the reduction of enough of the quadrivalent titanium (titanium dioxide) of the concentrate so that at least 40%, and generally between 40 and 60%, by weight of the titanium component of the concentrate is reduced to the trivalent state. That is, when the trivalent titanium content of the concentrate is determined by analysis and is expressed as the equivalent amount of $TiO_2$, this calculated amount of $TiO_2$ ranges between about 40% and 60% by weight of the total amount of $TiO_2$ determined on the basis of the total titanium content of the concentrate expressed as titanium dioxide. The concentrate is of sufficient fluidity at the prevailing smelting temperature to permit liquation of the molten iron product without requiring the presence of iron oxide or any extraneous fluxing agent. As a matter of fact, suitably fluid slag concentrates are produced by the practice of my invention even when the charge is composed solely of the aforementioned carbonaceous material and a beneficiated high grade ilmenite in which the total content of iron oxide and titanium dioxide is about 96% by weight of the ore.

I have also observed that the very low iron oxide content of my high trivalent titanium-content concentrate has a pronounced desulfurizing effect upon the body of molten iron upon which the molten concentrate floats in the furnace crucible. This desulfurizing effect, together with the fact that the hogged wood waste used as the principal or sole carbonaceous material in preparing the charge is virtually free of sulfur (as distinguished from coal which contains a significant amount of sulfur), makes it possible to produce a lower sulfur-content iron product than has been obtainable by previous smelting techniques. Thus, the smelting method of the present invention makes it possible to smelt relatively high sulfur-containing titaniferous ores which could not be smelted by the prior art processes without producing an objectionably high sulfur content to the metallic iron product, or, conversely, it makes it possible to obtain a lower sulfur-content iron product from the same relatively low sulfur-content titaniferous ores smelted heretofore. An advantage of producing an iron product of lower sulfur content resides in the fact that the lower its sulfur content the greater its solubility for carbon; therefore, a decrease in the sulfur content of the iron produces a higher carbon-content iron of enhanced market value. Moreover, the higher its carbon content the lower the melting point of the iron product with attendant advantages well known to those skilled in the art.

The following specific example is illustrative of the practice of the invention:

An ilmenite ore was used which was classified as 92.5 grade, that is, it contained a total of 92.5% by weight of titanium and iron oxides. Its titanium dioxide content was 36.7%, its total iron content (expressed as Fe) was 41.6%, and its sulfur content was 0.04%. This ore was mixed with hogged wood waste (consisting essentially of wood bark having a moisture content of 65% by weight) and metallurgical coke, the mixture being made up to contain 105 pounds of the wood waste and 8.3 pounds of the coke per 100 pounds of the ore. This mixture, which contained 17.1 pounds of fixed carbon per 100 pounds of ore, was charged to an electric arc furnace in amount sufficient to establish and to maintain a substantial depth of the charge above the lower ends of the electrodes. The power input to the furnace was controlled so as to produce a molten iron product and a molten titaniferous product having a temperature, when tapped from the furnace, of about 1650° C. The titaniferous product contained about 0.7% iron oxide (calculated as Fe) and about 85% titanium oxide (expressed as $TiO_2$) of which about 50% was in the form of trivalent titanium (all percentages being by weight). In spite of the relatively high sulfur content of the ore component of the charge, the iron product of this smelting operation contained only 1.07% by weight of sulfur.

It will be appreciated, accordingly, that the smelting method of the present invention makes possible the production of titaniferous concentrates characterized by a higher titanium content than those heretofore obtainable. The concentrate of my invention is superior to all other titaniferous concentrates as a starting material for the production of titanium tetrachloride because of its exceptionally high ratio of titanium to other constituents.

I claim:

1. The method of smelting iron oxide-bearing titaniferous ores in an electric arc fuurnace provided with graphite electrodes which comprises preparing a smelting charge mixture composed substantially exclusively of the ore and solid carbonaceous material in which at least a major portion of the volume of the charge consists of hogged wood waste, the total fixed carbon content of said carbonaceous material being such, in addition to the portion of the electrodes consumed during the smelting operation, as to provide at least that amount of carbon required to reduce all of the iron oxide component of the ore to metallic iron, delivering the charge to the furnace in such manner as to maintain submersion of the electrode arcs beneath the charge, and supplying heat to the charge by means of said arcs at a rate sufficient to effect smelting of the charge with the resulting formation of a metallic iron product and of a fluid supernatant titanium oxide-containing slag concentrate having a temperature of at least 1600° C., said slag concentrate containing less than 2% by weight of FeO (calculated as Fe) and having between about 40% and about 60% of its titanium oxide content in the form of trivalent titanium, and separately withdrawing the molten iron product and the molten slag concentrate from the furnace.

2. The method of smelting iron oxide-bearing titaniferous ores in an electric arc furnace provided with graphite electrodes which comprises preparing a smelting charge mixture composed substantially exclusively of the ore and of hogged wood waste, the total fixed carbon content of the hogged wood waste being such, in addition to the portion of the electrodes consumed during the smelting operation, as to provide at least that amount of carbon required to reduce all of the iron oxide component of the ore to metallic iron, delivering the charge to the furnace in such maner as to maintain submersion of the electrode arcs beneath the charge, and supplying heat to the charge by means of said arcs at a rate sufficient to effect smelting of the charge with the resulting formation of a metallic iron product and of a fluid supernatant titanium oxide-containing slag concentrate having a temperature of at least 1600° C., said slag concentrate containing less than 2% by weight of FeO (calculated as Fe) and having between about 40% and about 60% of its titanium oxide content in the form of trivalent titanium, and separately withdrawing the molten iron product and the molten slag concentrate from the furnace.

3. The method of smelting iron oxide-bearing titaniferous ores in an electric arc furnace provided with graphite electrodes which comprises preparing a smelting charge mixture composed substantially exclusively of the ore and solid carbonaceous material in which at least a major portion but less than all of the volume of the carbonaceous material consists of hogged wood waste and the balance consists essentially of metallurgical coke, the total fixed carbon content of said carbonaceous material being such, in addition to the portion of the electrodes consumed during the smelting operation, as to provide at least that amount of carbon required to reduce all of the iron oxide component of the ore to metallic iron, delivering the charge to the furnace in such manner as to maintain submersion of the electrode arcs beneath the charge, and supplying heat to the charge by means of said arcs at a rate sufficient to effect smelting of the charge with the resulting formation of a metallic iron product and of a fluid supernatant titanium oxide-containing slag concentrate having a temperature of at least 1600° C., said slag concentrate containing less than 2% by weight of FeO (calculated as Fe) and having between about 40% and about 60% of its titanium oxide content in the form of trivalent titanium, and separately withdrawing the molten iron product and the molten slag concentrate from the furnace.

4. The method of smelting iron oxide-bearing titaniferous ores in an electric arc furnace provided with graphite electrodes which comprises preparing a smelting charge mixture composed substantially exclusively of the ore and of hogged wood waste, the total fixed carbon content of the hogged wood waste being such, in addition to the portion of the electrodes consumed during the smelting operation, as to provide at least that amount of carbon required to reduce all of the iron oxide component of the ore to metallic iron, delivering the charge to the furnace in such manner as to maintain submersion of the electrode arcs beneath the charge, and supplying heat to the charge by means of said arcs at a rate sufficient to effect smelting of the charge with the resulting formation of a metallic iron product and of a fluid supernatant titanium oxide-containing slag concentrate having a temperature of about 1600°–1700° C., said slag concentrate containing less than 1% by weight of FeO (calculated as Fe) and having between about 40% and about 60% of its titanium oxide content in the form of trivalent titanuim, and separately withdrawing the molten iron product and the molten slag concentrate from the furnace.

References Cited in the file of this patent

UNITED STATES PATENTS 2,680,681     Armant et al.             June 8, 1954

OTHER REFERENCES

Journal of the Electrochemical Society, December 1954, page 614.

UNITED STATES PATENT OFFICE
CERTIFICATE OF CORRECTION

Patent No. 2,853,375                                                         September 23, 1958

Peter J. Ensio

It is hereby certified that error appears in the printed specification of the above numbered patent requiring correction and that the said Letters Patent should read as corrected below.

Column 5, line 2, for "1.07%" read -- 0.07% --; line 13, for

"fuurnace" read -- furnace --.

Signed and sealed this 9th day of December 1958.

(SEAL)
Attest:

KARL H. AXLINE
Attesting Officer

ROBERT C. WATSON
Commissioner of Patents